(12) United States Patent
Xia et al.

(10) Patent No.: US 10,039,126 B2
(45) Date of Patent: Jul. 31, 2018

(54) SCHEDULING METHOD, APPARATUS, AND SYSTEM

(71) Applicant: Huawei Technologies Co., Ltd., Shenzhen (CN)

(72) Inventors: Yinben Xia, Beijing (CN); Zhigang Ji, Beijing (CN); Xuewei Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 131 days.

(21) Appl. No.: 14/952,779

(22) Filed: Nov. 25, 2015

(65) Prior Publication Data
US 2016/0088649 A1 Mar. 24, 2016

Related U.S. Application Data

(63) Continuation of application No. PCT/CN2013/076493, filed on May 30, 2013.

(51) Int. Cl.
| | |
|---|---|
| *H04W 72/04* | (2009.01) |
| *H04W 72/12* | (2009.01) |
| *H04L 12/729* | (2013.01) |
| *H04L 12/911* | (2013.01) |
| *H04L 12/825* | (2013.01) |
| *H04L 12/841* | (2013.01) |

(52) U.S. Cl.
CPC ....... *H04W 72/1252* (2013.01); *H04L 45/125* (2013.01); *H04L 47/26* (2013.01); *H04L 47/28* (2013.01); *H04L 47/826* (2013.01); *H04W 72/0446* (2013.01)

(58) Field of Classification Search
CPC . H04L 45/125; H04L 47/826; H04W 72/1252
See application file for complete search history.

(56) References Cited

U.S. PATENT DOCUMENTS

| | | |
|---|---|---|
| 6,512,743 B1 | 1/2003 | Fang |
| 7,860,098 B1 | 12/2010 | Biswas et al. |
| 8,537,744 B2 | 9/2013 | Chou |

(Continued)

FOREIGN PATENT DOCUMENTS

| | | |
|---|---|---|
| CN | 1599355 A | 3/2005 |
| CN | 101151847 A | 3/2008 |

(Continued)

*Primary Examiner* — Asad Nawaz
*Assistant Examiner* — Syed S Ali
(74) *Attorney, Agent, or Firm* — Slater Matsil, LLP (57) ABSTRACT

The application provides a scheduling method, apparatus and system. A controller receives scheduling request information sent by a content source. The scheduling request information includes a constraint condition of non-real-time traffic transmission, and the constraint condition includes: information about a first address and information about a second address. A first forwarding path and a sending time for sending the traffic are determined according to the information about the first address, the information about the second address, and statistical information about network traffic. The controller sends a first message that includes a sending rate to the content source at the sending time, and the traffic is sent through the first forwarding path.

18 Claims, 5 Drawing Sheets

(56) References Cited

U.S. PATENT DOCUMENTS

| | | | |
|---|---|---|---|
| 2003/0174648 A1* | 9/2003 | Wang | H04L 65/1013 370/235 |
| 2005/0094576 A1 | 5/2005 | Fonseca, Jr. et al. | |
| 2005/0195816 A1* | 9/2005 | Sumiyoshi | H04L 12/18 370/390 |
| 2006/0215577 A1 | 9/2006 | Guichard et al. | |
| 2010/0228814 A1* | 9/2010 | McKenna | H04L 12/189 709/203 |
| 2010/0254297 A1* | 10/2010 | McKenna | G06Q 30/0601 370/312 |
| 2011/0066747 A1* | 3/2011 | McKenna | H04N 7/17327 709/231 |
| 2011/0225311 A1* | 9/2011 | Liu | H04L 45/125 709/231 |
| 2013/0159395 A1* | 6/2013 | Backholm | H04L 29/08099 709/203 |
| 2013/0282920 A1* | 10/2013 | Zhang | H04L 45/74 709/238 |
| 2014/0003247 A1* | 1/2014 | Zheng | H04L 43/0882 370/237 |
| 2014/0081871 A1* | 3/2014 | Kidron | G06F 17/30867 705/59 |
| 2014/0223099 A1* | 8/2014 | Kidron | G06F 12/0806 711/118 |
| 2014/0307556 A1* | 10/2014 | Zhang | H04L 45/302 370/236 |
| 2015/0055623 A1* | 2/2015 | Li | H04W 40/04 370/331 |
| 2015/0188949 A1* | 7/2015 | Mahaffey | H04L 63/20 726/1 |
| 2016/0337675 A1* | 11/2016 | Mutton | H04N 19/40 |

FOREIGN PATENT DOCUMENTS

| | | |
|---|---|---|
| CN | 101438543 A | 5/2009 |
| CN | 101707556 A | 5/2010 |
| CN | 102546749 A | 7/2012 |
| EP | 2352261 A1 | 8/2011 |
| GB | 2466349 A | 6/2010 |
| WO | 2007125514 A2 | 11/2007 |
| WO | 2008073610 A1 | 6/2008 |

* cited by examiner

FIG. 9

SCHEDULING METHOD, APPARATUS, AND SYSTEM

This application is a continuation of International Application No. PCT/CN2013/076493, filed on May 30, 2013, which is hereby incorporated by reference in its entirety.

TECHNICAL FIELD

The application relates to the field of Internet technologies, and in particular, to a scheduling method, apparatus, and system.

BACKGROUND

As Internet technologies are developing and becoming mature, Internet users are increasing continuously, and people's work, life and entertainment are more dependent on a network. Therefore, user traffic in the network also sharply increases accordingly, which causes that the network becomes more congested and user experience of Internet surfing decreases greatly. In a traditional distributed network architecture, each content source runs independently. Therefore, a current network status cannot be considered when any content source initiates traffic. In addition, traffic in the network includes a large amount of non-real-time and high-bandwidth content traffic, such as geographic redundancy traffic of a data center, synchronization traffic of a content delivery network (CDN), and migration traffic of a virtual machine (VM). The traffic conflicts with traffic with a high real-time requirement, thereby diminishing user experience of a real-time service. Therefore, a higher requirement is imposed on network construction, and scheduling and use of network resources.

Generally, when constructing a network, a network constructor performs planning and construction according to prediction on peak-hour network traffic. However, with a continuous increase of users who surf the Internet, network traffic also increases continuously, and the peak-hour traffic continuously exceeds designer's expectation, resulting in network congestion during the peak hour and degraded service quality. If the peak-hour traffic is handled only by improving network resources, network construction costs will increase greatly, and only network resources are wasted most of the time.

In the prior art, a software defined network (SDN) separates a control plane of a network device from a data plane of the network device, so as to implement flexible control of network traffic and facilitates innovation of a core network and application. By scheduling network resources, the software defined network balances unbalanced utilization of resources in a network, which, however, can be performed only within a range of resources carried in the entire network, and when peak-hour traffic exceeds the range of the resources in the entire network, a case in which the network is congested still exits. Therefore, a problem that the resources in the entire network are inadequate during the peak hour still cannot be resolved.

SUMMARY

Embodiments of the application provide a scheduling method, apparatus, and system, in which pre-scheduling may be performed on non-real-time traffic transmission with reference to information about network traffic, thereby reducing traffic pressure of an entire network.

A first aspect of the embodiments of the application provides a scheduling method, including: receiving, by a controller, scheduling request information sent by a content source, where the scheduling request information includes a constraint condition of non-real-time traffic transmission, and the constraint condition includes: information about a first address and information about a second address, where the information about the first address is information about an address of a device that sends the traffic, and the information about the second address is information about an address of a device that receives the traffic; determining, by the controller according to the information about the first address, the information about the second address, and statistical information about network traffic, a first forwarding path and a sending time for sending the traffic; and sending, by the controller, a first message that includes a sending rate to the content source at the sending time, where the first message is used to instruct the content source to send the traffic according to the sending rate, and the traffic is sent through the first forwarding path.

In a first possible implementation manner, the determining, by the controller according to the information about the first address, the information about the second address, and statistical information about network traffic, a first forwarding path and a sending time for sending the traffic includes: determining, by the controller according to the information about the first address and the information about the second address, forwarding paths for sending the traffic; and determining, by the controller from the forwarding paths according to the statistical information about network traffic, the first forwarding path and the sending time for sending the traffic.

With reference to the first possible implementation manner of the first aspect, in a second possible implementation manner, the determining, by the controller from the forwarding paths according to the statistical information about network resources, the first forwarding path and the sending time for sending the traffic includes: selecting, by the controller from the forwarding paths according to the statistical information about network traffic, forwarding paths that meet a maximum link bandwidth requirement in a network; and determining, by the controller from the forwarding paths that meet the maximum link bandwidth requirement in the network, the first forwarding path and the sending time for sending the traffic.

With reference to the second possible implementation manner of the first aspect, in a third possible implementation manner, the determining, by the controller from the forwarding paths that meet the maximum link bandwidth requirement in the network, the first forwarding path and the sending time for sending the traffic includes: determining, by the controller, link bandwidth utilization rates that are of the forwarding paths that meet the maximum link bandwidth requirement in the network and at a time point every other preset time period; determining, by the controller, bandwidth utilization rates that are of the forwarding paths that meet the maximum link bandwidth requirement in the network and at a time point every other preset time period; and selecting, by the controller, a forwarding path of which a bandwidth utilization rate is the lowest as the first forwarding path; and selecting, by the controller, a time at which the bandwidth utilization rate is the lowest as the sending time.

With reference to the first, the second, or the third possible implementation manner of the first aspect, in a fourth possible implementation manner, the sending rate is obtained by subtracting traffic of the first forwarding path at a preset time prior to the sending time from maximum link bandwidth of the first forwarding path.

With reference to the first aspect, or with reference to the first, the second, the third, or the fourth possible implementation manner of the first aspect, in a fifth possible implementation manner, the constraint condition further includes at least one of the following: information about a time at which the traffic is transmitted, information about minimum bandwidth for transmitting the traffic, and information about a total amount of the traffic.

With reference to the first aspect, or with reference to the first, the second, the third, the fourth, or the fifth possible implementation manner of the first aspect, in a sixth possible implementation manner, the method further includes: separately delivering, by the controller, a corresponding forwarding entry to a device on the first forwarding path.

With reference to the first aspect, or with reference to the first, the second, the third, the fourth, the fifth, or the sixth possible implementation manner of the first aspect, in a seventh possible implementation manner, the method further includes: monitoring, by the controller, a real-time bandwidth utilization rate of the first forwarding path after the sending time; and when the real-time network bandwidth utilization rate continuously decreases or increases during a preset time period, sending, by the controller, a second message to the content source, where the second message is used to instruct the content source to adjust the sending rate for transmitting the traffic.

With reference to the seventh possible implementation manner of the first aspect, in an eighth possible implementation manner, the method further includes: sending, by the controller, an updated forwarding entry to the device on the first forwarding path.

With reference to the sixth, the seventh, or the eighth possible implementation manner of the first aspect, in a ninth possible implementation manner, the method further includes: receiving, by the controller, a third message sent by the content source, where the third message is used to notify that transmission of the traffic is completed; and instructing, by the controller, the device on the first forwarding path to delete the corresponding forwarding entry.

With reference to the second, the third, the fourth, the fifth, the sixth, the seventh, the eighth, or the ninth possible implementation manner of the first aspect, in a tenth possible implementation manner, the method further includes: saving, by the controller, the link bandwidth utilization rates of the forwarding paths that meet the maximum link bandwidth requirement in the network.

A second aspect of the embodiments of the application provides a scheduling apparatus, where the apparatus may include: a receiving module, configured to receive scheduling request information sent by a content source, where the scheduling request information includes a constraint condition of non-real-time traffic transmission, and the constraint condition includes: information about a first address and information about a second address, where the information about the first address is information about an address of a device that sends the traffic, and the information about the second address is information about an address of a device that receives the traffic; a calculation module, configured to determine, according to the information about the first address, the information about the second address, and statistical information about network traffic, a first forwarding path and a sending time for sending the traffic; and a sending module, configured to send a first message that includes a sending rate to the content source at the sending time, where the first message is used to instruct the content source to send the traffic according to the sending rate, and the traffic is sent through the first forwarding path.

In a first possible implementation manner, the calculation module is specifically configured to: determine, according to the information about the first address and the information about the second address, forwarding paths for sending the traffic; and determine, from the forwarding paths according to the statistical information about network traffic, the first forwarding path and the sending time for sending the traffic.

With reference to the first possible implementation manner of the second aspect, in a second possible implementation manner, the calculation module is further configured to: select, from the forwarding paths according to the statistical information about network traffic, forwarding paths that meet a maximum link bandwidth requirement in a network; and determine, from the forwarding paths that meet the maximum link bandwidth requirement in the network, the first forwarding path and the sending time for sending the traffic.

With reference to the second possible implementation manner of the second aspect, in a third possible implementation manner, the calculation module is still further configured to: determine link bandwidth utilization rates that are of the forwarding paths that meet the maximum link bandwidth requirement in the network and at a time point every other preset time period; determine bandwidth utilization rates that are of the forwarding paths that meet the maximum link bandwidth requirement in the network and at a time point every other preset time period; and select a forwarding path of which a bandwidth utilization rate is the lowest as the first forwarding path; and select a time at which the bandwidth utilization rate is the lowest as the sending time.

With reference to the first, the second, or the third possible implementation manner of the second aspect, in a fourth possible implementation manner, the sending rate is obtained by subtracting traffic of the first forwarding path at a preset time prior to the sending time from maximum link bandwidth of the first forwarding path.

With reference to the second aspect, or with reference to the first, the second, the third, or the fourth possible implementation manner of the second aspect, in a fifth possible implementation manner, the constraint condition further includes at least one of the following: information about a time at which the traffic is transmitted, information about minimum bandwidth for transmitting the traffic, and information about a total amount of the traffic.

With reference to the second aspect, or with reference to the first, the second, the third, the fourth, or the fifth possible implementation manner of the second aspect, in a sixth possible implementation manner, the sending module is further configured to: separately deliver a corresponding forwarding entry to a device on the first forwarding path.

With reference to the second aspect, or with reference to the first, the second, the third, the fourth, the fifth, or the sixth possible implementation manner of the second aspect, in a seventh possible implementation manner, the apparatus further includes: a monitoring module, configured to monitor a real-time bandwidth utilization rate of the first forwarding path after the sending time. The sending module is further configured to: when the real-time network bandwidth utilization rate continuously decreases or increases during a preset time period, send a second message to the content source, where the second message is used to instruct the content source to adjust the sending rate for transmitting the traffic.

With reference to the seventh possible implementation manner of the second aspect, in an eighth possible implementation manner, the sending module is further configured to send an updated forwarding entry to the device on the first forwarding path.

With reference to the sixth, the seventh, or the eighth possible implementation manner of the second aspect, in a ninth possible implementation manner, the receiving module is further configured to receive a third message sent by the content source, where the third message is used to notify that transmission of the traffic is completed; and the sending module is further configured to instruct the device on the first forwarding path to delete the corresponding forwarding entry.

With reference to the second, the third, the fourth, the fifth, the sixth, the seventh, the eighth, or the ninth possible implementation manner of the second aspect, in a tenth possible implementation manner, the calculation module is further configured to: save the link bandwidth utilization rates of the forwarding paths that meet the maximum link bandwidth requirement in the network.

A third aspect of the embodiments of the application provides a scheduling system, where the system may include: a content source, configured to send scheduling request information, where the scheduling request information includes a constraint condition of non-real-time traffic transmission, and the constraint condition includes: information about a first address and information about a second address, where the information about the first address is information about an address of a device that sends the traffic, and the information about the second address is information about an address of a device that receives the traffic; and a controller, configured to receive the scheduling request information; determine, according to the information about the first address, the information about the second address, and statistical information about network traffic, a first forwarding path and a sending time for sending the traffic; and send a first message that includes a sending rate to the content source at the sending time, where the first message is used to instruct the content source to send the traffic according to the sending rate, and the traffic is sent through the first forwarding path.

In a first possible implementation manner, the controller is specifically configured to: determine, according to the information about the first address and the information about the second address, forwarding paths for sending the traffic; select, from the forwarding paths according to the statistical information about network traffic, forwarding paths that meet a maximum link bandwidth requirement in a network; determine link bandwidth utilization rates that are of the forwarding paths that meet the maximum link bandwidth requirement in the network and at a time point every other preset time period; determine bandwidth utilization rates that are of the forwarding paths that meet the maximum link bandwidth requirement in the network and at a time point every other preset time period; and select a forwarding path of which a bandwidth utilization rate is the lowest as the first forwarding path; and select a time at which the bandwidth utilization rate is the lowest as the sending time.

With reference to the first possible implementation manner of the third aspect, in a second possible implementation manner, the sending rate is obtained by subtracting traffic of the first forwarding path at a preset time prior to the sending time from maximum link bandwidth of the first forwarding path; the constraint condition further includes at least one of the following: information about a time at which the traffic is transmitted, information about minimum bandwidth for transmitting the traffic, and information about a total amount of the traffic.

With reference to the first or the second possible implementation manner of the third aspect, in a third possible implementation manner, the controller is further configured to: separately deliver a corresponding forwarding entry to a device on the first forwarding path; monitor a real-time bandwidth utilization rate of the first forwarding path after the sending time; when the real-time network bandwidth utilization rate continuously decreases or increases during a preset time period, send a second message to the content source, where the second message is used to instruct the content source to adjust the sending rate for transmitting the traffic; send an updated forwarding entry to the device on the first forwarding path; receive a third message sent by the content source, where the third message is used to notify that transmission of the traffic is completed; instruct the device on the first forwarding path to delete the corresponding forwarding entry; and save the link bandwidth utilization rates of the forwarding paths that meet the maximum link bandwidth requirement in the network.

The following beneficial effects are brought by implementing the embodiments of the application:

Pre-scheduling is performed on non-real-time traffic, and a first forwarding path and a sending time for sending the traffic are determined according to scheduling request information of a content source and statistical information about network traffic. In this way, occurrence of a traffic peak can be reduced, network pressure can be relieved, and in a case in which a total amount of the network traffic is not changed, a utilization rate of the network traffic can be improved and cases in which a network is congested can be reduced. This helps improve user experience of using the network.

BRIEF DESCRIPTION OF THE DRAWINGS

To describe the technical solutions in the embodiments of the application more clearly, the following briefly introduces the accompanying drawings required for describing the embodiments. Apparently, the accompanying drawings in the following description show merely some embodiments of the application, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the application with reference to the accompanying drawings in the embodiments of the application. Apparently, the described embodiments are merely some but not all of the embodiments of the application. All other embodiments obtained by a person of ordinary skill in the art based on the embodiments of the application without creative efforts shall fall within the protection scope of the application.

Figure 1:
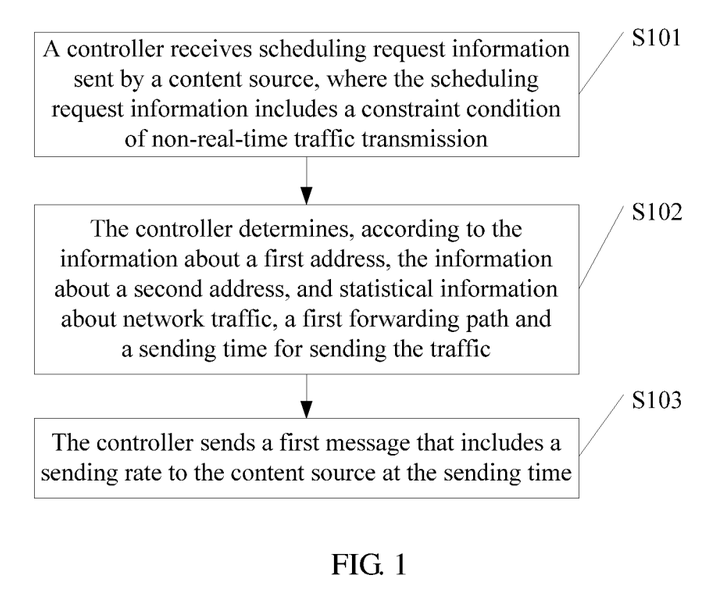
FIG. 1 is a schematic flowchart of a first embodiment of a scheduling method according to the application.

FIG. 1 is a schematic flowchart of a first embodiment of a scheduling method according to the application. In this embodiment, the method includes the following steps.

S101. A controller receives scheduling request information sent by a content source, where the scheduling request information includes a constraint condition of non-real-time traffic transmission.

The constraint condition includes: information about a first address and information about a second address, where the information about the first address is information about an address of a device that sends the traffic, and the information about the second address is information about an address of a device that receives the traffic.

S102. The controller determines, according to the information about the first address, the information about the second address, and statistical information about network traffic, a first forwarding path and a sending time for sending the traffic.

When determining the first forwarding path and the sending time for sending the traffic, the controller may first determine, according to the information about the first address and the information about the second address, forwarding paths for sending the traffic.

Specifically, there is a large number of devices in a network topology, and one link exists between every two devices. Therefore, a forwarding path from the first address to the second address may include different links. The controller may first collect statistics on forwarding paths that may be used for sending the traffic.

In these different forwarding paths, the first forwarding path and the sending time for sending the traffic are further determined from the forwarding paths according to the statistical information about network traffic. Statistics on the information about network traffic may start to be collected when a network is initialized, that is, when a network device is powered on to work, or statistics may start to be collected during a time period prior to traffic scheduling. The information about network traffic is collected and saved for network traffic analysis and prediction, which provides a good basis for subsequent traffic scheduling. For example, statistics on information about network traffic during the last three months may be collected and saved, and links and time points at which a peak and a trough of the network traffic occur, and the like are analyzed, so as to select a preferable forwarding path and sending time during subsequent traffic scheduling.

Optionally, when determining, from the forwarding paths according to the statistical information about network traffic, the first forwarding path and the sending time for sending the traffic, the controller may first select, from the forwarding paths according to the statistical information about network traffic, forwarding paths that meet a maximum link bandwidth requirement in a network, and then determine, from the forwarding paths that meet the maximum link bandwidth requirement in the network, the first forwarding path and the sending time for sending the traffic.

More optionally, when determining, from the forwarding paths that meet the maximum link bandwidth requirement in the network, the first forwarding path and the sending time for sending the traffic, the controller may determine link bandwidth utilization rates that are of the forwarding paths that meet the maximum link bandwidth requirement in the network and at a time point every other preset time period; then determine bandwidth utilization rates that are of the forwarding paths that meet the maximum link bandwidth requirement in the network and at a time point every other preset time period; and then select a forwarding path of which a bandwidth utilization rate is the lowest as the first forwarding path, and select a time at which the bandwidth utilization rate is the lowest as the sending time.

For example, information about network traffic during the last seven days may be used for analysis. It is assumed that a preset time period is 15 minutes, and statistics on link bandwidth utilization rates at all time points every 15 minutes during the last seven days may be collected, so as to obtain bandwidth utilization rates of forwarding paths. To reduce network pressure, pre-scheduling may be performed on non-real-time traffic, so as to transmit the non-real-time traffic on a first forwarding path of which a bandwidth utilization rate is the lowest and at a time at which the bandwidth utilization rate is the lowest. For example, traffic transmitted on a forwarding path A is relatively small generally, and a network bandwidth utilization rate of the forwarding path A is relatively low during a time period from 2:00 a.m. to 5:00 a.m. Then, when non-real-time traffic transmission needs to be performed, 3:00 a.m. may be chosen to send traffic on the forwarding path A, so as to implement that in a case in which a total amount of the network traffic is not changed, utilization efficiency of the network traffic is improved, network pressure is reduced, and user experience of using a network is improved. Some useful data obtained through analysis may be saved. For example, the link bandwidth utilization rates of the forwarding paths that meet the maximum link bandwidth requirement in the network are saved. In this way, efficiency of scheduling and determining the first forwarding path and the sending time may be improved.

S103. The controller sends a first message that includes a sending rate to the content source at the sending time.

The first message is used to instruct the content source to send the traffic according to the sending rate, and the traffic is sent through the first forwarding path.

The sending rate is obtained by subtracting traffic of the first forwarding path at a preset time prior to the sending time from maximum link bandwidth of the first forwarding path.

Certainly, the first message may alternatively be sent before the sending time. However, sending the first message at the sending time helps the controller adjust scheduling according to a real-time change status of the network traffic, and real time quality is better. When the first forwarding path is selected as an optimal forwarding path, a second forwarding path may further be selected as an alternate path, so that when an emergency occurs, traffic sending can still be completed.

The constraint condition sent by the content source to the controller may further include at least one of the following: information about a time at which the traffic is transmitted, information about minimum bandwidth for transmitting the traffic, and information about a total amount of the traffic. According to the information, when selecting the first forwarding path and the sending time, the controller may select, from results obtained by the controller, a forwarding path and a sending time that meet a content source request as much as possible. For example, in the results obtained by the controller, a lowest bandwidth utilization rate of the forwarding path A is 10% at 3:00 a.m., but bandwidth of the forwarding path A is relatively low; a bandwidth utilization rate of a forwarding path B is kept at 50% at 5:00 a.m., but bandwidth of the forwarding path B is relatively high; a time at which the content source requests to send the traffic is 4:30 a.m., and a total amount of the traffic is relatively large. Therefore, it is comprehensively considered that the forwarding path B may be selected as the optimal path, and 5:00 a.m. may be selected as the sending time.

In this embodiment, pre-scheduling is performed on non-real-time traffic, and a first forwarding path and a sending time for sending the traffic are determined according to scheduling request information of a content source and statistical information about network traffic. In this way, occurrence of a traffic peak can be reduced, network pressure can be relieved, and in a case in which a total amount of the network traffic is not changed, a utilization rate of the network traffic can be improved and cases in which a network is congested can be reduced. This helps improve user experience of using the network.

Figure 2:
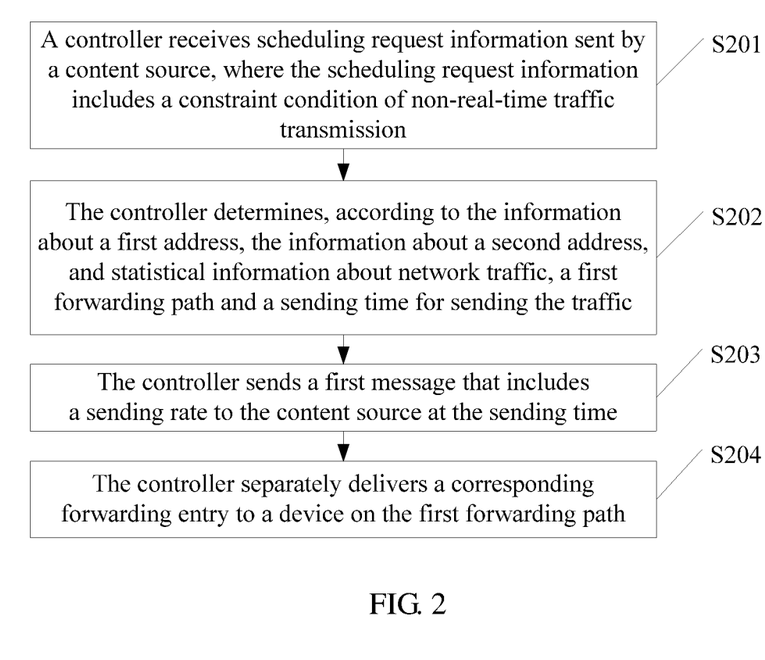
FIG. 2 is a schematic flowchart of a second embodiment of a scheduling method according to the application.

FIG. 2 is a schematic flowchart of a second embodiment of a scheduling method according to the application. In this embodiment, the method includes the following steps.

S201. A controller receives scheduling request information sent by a content source, where the scheduling request information includes a constraint condition of non-real-time traffic transmission.

The constraint condition includes: information about a first address and information about a second address, where the information about the first address is information about an address of a device that sends the traffic, and the information about the second address is information about an address of a device that receives the traffic.

S202. The controller determines, according to the information about the first address, the information about the second address, and statistical information about network traffic, a first forwarding path and a sending time for sending the traffic.

When determining the first forwarding path and the sending time for sending the traffic, the controller may first determine, according to the information about the first address and the information about the second address, forwarding paths for sending the traffic.

Specifically, there is a large number of devices in a network topology, and one link exists between every two devices. Therefore, a forwarding path from the first address to the second address may include different links. The controller may first collect statistics on forwarding paths that may be used for sending the traffic.

In these different forwarding paths, the first forwarding path and the sending time for sending the traffic are further determined from the forwarding paths according to the statistical information about network traffic. Statistics on the information about network traffic may start to be collected when a network is initialized, that is, when a network device is powered on to work, or statistics may start to be collected during a time period prior to traffic scheduling. The information about network traffic is collected and saved for network traffic analysis and prediction, which provides a good basis for subsequent traffic scheduling. For example, statistics on information about network traffic during the last three months may be collected and saved, and links and time points at which a peak and a trough of the network traffic occur, and the like are analyzed, so as to select a preferable forwarding path and sending time during subsequent traffic scheduling.

Optionally, when determining, from the forwarding paths according to the statistical information about network traffic, the first forwarding path and the sending time for sending the traffic, the controller may first select, from the forwarding paths according to the statistical information about network traffic, forwarding paths that meet a maximum link bandwidth requirement in a network, and then determine, from the forwarding paths that meet the maximum link bandwidth requirement in the network, the first forwarding path and the sending time for sending the traffic.

More optionally, when determining, from the forwarding paths that meet the maximum link bandwidth requirement in the network, the first forwarding path and the sending time for sending the traffic, the controller may determine link bandwidth utilization rates that are of the forwarding paths that meet the maximum link bandwidth requirement in the network and at a time point every other preset time period; then determine bandwidth utilization rates that are of the forwarding paths that meet the maximum link bandwidth requirement in the network and at a time point every other preset time period; and then select a forwarding path of which a bandwidth utilization rate is the lowest as the first forwarding path, and select a time at which the bandwidth utilization rate is the lowest as the sending time.

For example, information about network traffic during the last seven days may be used for analysis. It is assumed that a preset time period is 15 minutes, and statistics on link bandwidth utilization rates at all time points every 15 minutes during the last seven days may be collected, so as to obtain bandwidth utilization rates of forwarding paths. To reduce network pressure, pre-scheduling may be performed on non-real-time traffic, so as to transmit the non-real-time traffic on a first forwarding path of which a bandwidth utilization rate is the lowest and at a time at which the bandwidth utilization rate is the lowest. For example, traffic transmitted on a forwarding path A is relatively small generally, and a network bandwidth utilization rate of the forwarding path A is relatively low during a time period from 2:00 a.m. to 5:00 a.m. Then, when non-real-time traffic transmission needs to be performed, 3:00 a.m. may be chosen to send traffic on the forwarding path A, so as to implement that in a case in which a total amount of the network traffic is not changed, utilization efficiency of the network traffic is improved, network pressure is reduced, and user experience of using a network is improved. Some useful data obtained through analysis may be saved. For example, the link bandwidth utilization rates of the forwarding paths that meet the maximum link bandwidth requirement in the network are saved. In this way, efficiency of scheduling and determining the first forwarding path and the sending time may be improved.

S203. The controller sends a first message that includes a sending rate to the content source at the sending time.

The first message is used to instruct the content source to send the traffic according to the sending rate, and the traffic is sent through the first forwarding path.

The sending rate is obtained by subtracting traffic of the first forwarding path at a preset time prior to the sending time from maximum link bandwidth of the first forwarding path.

Certainly, the first message may alternatively be sent before the sending time. However, sending the first message at the sending time helps the controller adjust scheduling according to a real-time change status of the network traffic, and real time quality is better. When the first forwarding path is selected as an optimal forwarding path, a second forwarding path may further be selected as an alternate path, so that when an emergency occurs, traffic sending can still be completed.

The constraint condition sent by the content source to the controller may further include at least one of the following: information about a time at which the traffic is transmitted, information about minimum bandwidth for transmitting the traffic, and information about a total amount of the traffic. According to the information, when selecting the first forwarding path and the sending time, the controller may select, from results obtained by the controller, a forwarding path and a sending time that meet a content source request as much as possible. For example, in the results obtained by the controller, a lowest bandwidth utilization rate of the forwarding path A is 10% at 3:00 a.m., but bandwidth of the forwarding path A is relatively low; a bandwidth utilization rate of a forwarding path B is kept at 50% at 5:00 a.m., but bandwidth of the forwarding path B is relatively high; a time at which the content source requests to send the traffic is 4:30 a.m., and a total amount of the traffic is relatively large. Therefore, it is comprehensively considered that the forwarding path B may be selected as the optimal path, and 5:00 a.m. may be selected as the sending time.

S204. The controller separately delivers a corresponding forwarding entry to a device on the first forwarding path.

Specifically, after the first forwarding path is determined, by delivering the corresponding forwarding entry, the controller may notify the device on the first forwarding path of information about the scheduling, such as a total amount of traffic to be sent, a sending rate, a sending time, and a component link, which helps the related device establish a sending channel and make a preparation for sending the traffic.

Figure 3:
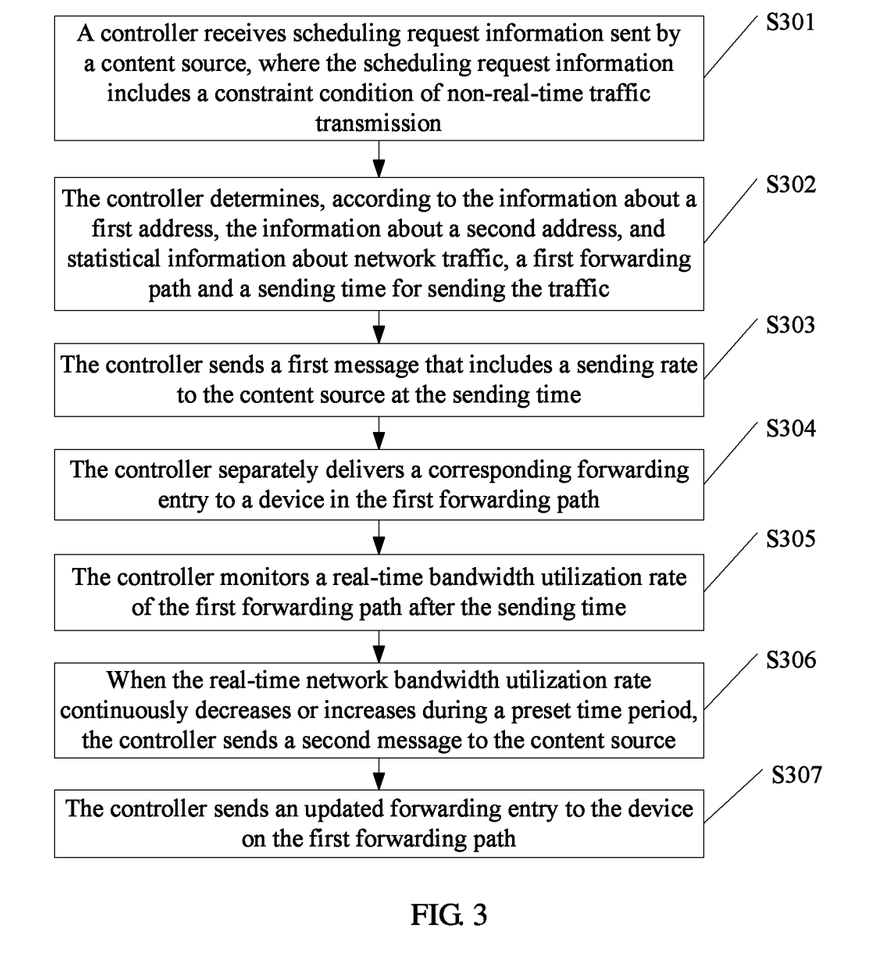
FIG. 3 is a schematic flowchart of a third embodiment of a scheduling method according to the application.

FIG. 3 is a schematic flowchart of a third embodiment of a scheduling method according to the application. In this embodiment, the method includes the following steps.

S301. A controller receives scheduling request information sent by a content source, where the scheduling request information includes a constraint condition of non-real-time traffic transmission.

The constraint condition includes: information about a first address and information about a second address, where the information about the first address is information about an address of a device that sends the traffic, and the information about the second address is information about an address of a device that receives the traffic.

S302. The controller determines, according to the information about the first address, the information about the second address, and statistical information about network traffic, a first forwarding path and a sending time for sending the traffic.

When determining the first forwarding path and the sending time for sending the traffic, the controller may first determine, according to the information about the first address and the information about the second address, forwarding paths for sending the traffic.

Specifically, there is a large number of devices in a network topology, and one link exists between every two devices. Therefore, a forwarding path from the first address to the second address may include different links. The controller may first collect statistics on forwarding paths that may be used for sending the traffic.

In these different forwarding paths, the first forwarding path and the sending time for sending the traffic are further determined from the forwarding paths according to the statistical information about network traffic. Statistics on the information about network traffic may start to be collected when a network is initialized, that is, when a network device is powered on to work, or statistics may start to be collected during a time period prior to traffic scheduling. The information about network traffic is collected and saved for network traffic analysis and prediction, which provides a good basis for subsequent traffic scheduling. For example, statistics on information about network traffic during the last three months may be collected and saved, and links and time points at which a peak and a trough of the network traffic occur, and the like are analyzed, so as to select a preferable forwarding path and sending time during subsequent traffic scheduling.

Optionally, when determining, from the forwarding paths according to the statistical information about network traffic, the first forwarding path and the sending time for sending the traffic, the controller may first select, from the forwarding paths according to the statistical information about network traffic, forwarding paths that meet a maximum link bandwidth requirement in a network, and then determine, from the forwarding paths that meet the maximum link bandwidth requirement in the network, the first forwarding path and the sending time for sending the traffic.

More optionally, when determining, from the forwarding paths that meet the maximum link bandwidth requirement in the network, the first forwarding path and the sending time for sending the traffic, the controller may determine link bandwidth utilization rates that are of the forwarding paths that meet the maximum link bandwidth requirement in the network and at a time point every other preset time period; then determine bandwidth utilization rates that are of the forwarding paths that meet the maximum link bandwidth requirement in the network and at a time point every other preset time period; and then select a forwarding path of which a bandwidth utilization rate is the lowest as the first forwarding path, and select a time at which the bandwidth utilization rate is the lowest as the sending time.

For example, information about network traffic during the last seven days may be used for analysis. It is assumed that a preset time period is 15 minutes, and statistics on link bandwidth utilization rates at all time points every 15 minutes during the last seven days may be collected, so as to obtain bandwidth utilization rates of forwarding paths. To reduce network pressure, pre-scheduling may be performed on non-real-time traffic, so as to transmit the non-real-time traffic on a first forwarding path of which a bandwidth utilization rate is the lowest and at a time at which the bandwidth utilization rate is the lowest. For example, traffic transmitted on a forwarding path A is relatively small generally, and a network bandwidth utilization rate of the forwarding path A is relatively low during a time period from 2:00 a.m. to 5:00 a.m. Then, when non-real-time traffic transmission needs to be performed, 3:00 a.m. may be chosen to send traffic on the forwarding path A, so as to implement that in a case in which a total amount of the network traffic is not changed, utilization efficiency of the network traffic is improved, network pressure is reduced, and user experience of using a network is improved. Some useful data obtained through analysis may be saved. For example, the link bandwidth utilization rates of the forwarding paths that meet the maximum link bandwidth requirement in the network are saved. In this way, efficiency of scheduling and determining the first forwarding path and the sending time may be improved.

S303. The controller sends a first message that includes a sending rate to the content source at the sending time.

The first message is used to instruct the content source to send the traffic according to the sending rate, and the traffic is sent through the first forwarding path.

The sending rate is obtained by subtracting traffic of the first forwarding path at a preset time prior to the sending time from maximum link bandwidth of the first forwarding path.

Certainly, the first message may alternatively be sent before the sending time. However, sending the first message at the sending time helps the controller adjust scheduling according to a real-time change status of the network traffic, and real time quality is better. When the first forwarding path is selected as an optimal forwarding path, a second forwarding path may further be selected as an alternate path, so that when an emergency occurs, traffic sending can still be completed.

The constraint condition sent by the content source to the controller may further include at least one of the following: information about a time at which the traffic is transmitted, information about minimum bandwidth for transmitting the traffic, and information about a total amount of the traffic. According to the information, when selecting the first forwarding path and the sending time, the controller may select, from results obtained by the controller, a forwarding path and a sending time that meet a content source request as much as possible. For example, in the results obtained by the controller, a lowest bandwidth utilization rate of the forwarding path A is 10% at 3:00 a.m., but bandwidth of the forwarding path A is relatively low; a bandwidth utilization rate of a forwarding path B is kept at 50% at 5:00 a.m., but bandwidth of the forwarding path B is relatively high; a time at which the content source requests to send the traffic is 4:30 a.m., and a total amount of the traffic is relatively large. Therefore, it is comprehensively considered that the forwarding path B may be selected as the optimal path, and 5:00 a.m. may be selected as the sending time.

S304. The controller separately delivers a corresponding forwarding entry to a device on the first forwarding path.

Specifically, after the first forwarding path is determined, by delivering the corresponding forwarding entry, the controller may notify the device on the first forwarding path of information about the scheduling, such as a total amount of traffic to be sent, a sending rate, a sending time, and a component link, which helps the related device establish a sending channel and make a preparation for sending the traffic.

S305. The controller monitors a real-time bandwidth utilization rate of the first forwarding path after the sending time.

S306. When the real-time network bandwidth utilization rate continuously decreases or increases during a preset time period, the controller sends a second message to the content source.

The second message is used to instruct the content source to adjust the sending rate for transmitting the traffic.

Specifically, when the real-time network bandwidth utilization rate continuously decreases during the preset time period, the controller instructs the content source to increase the sending rate for transmitting the traffic; or when the real-time network bandwidth utilization rate continuously increases during the preset time period, the controller instructs the content source to decrease the sending rate for transmitting the traffic.

Certainly, when the real-time network bandwidth utilization rate continuously increases during the preset time period and therefore transmission of the traffic cannot be completed, transmission of the traffic may be suspended, and transmission is not resumed until the real-time network bandwidth utilization rate decreases; or when the first forwarding path is calculated, a second forwarding path is reserved as an alternate forwarding path, so that when the first forwarding path cannot transmit the traffic, the alternative forwarding path is enabled to complete transmission of the traffic.

S307. The controller sends an updated forwarding entry to the device on the first forwarding path.

If the controller instructs, according to a change in the real-time network bandwidth utilization rate, the content source to correspondingly adjust the sending rate, the controller needs to integrate adjustment information into the updated forwarding entry, and sends the updated forwarding entry to the device on the first forwarding path, so that the device performs corresponding adjustment.

Figure 4:
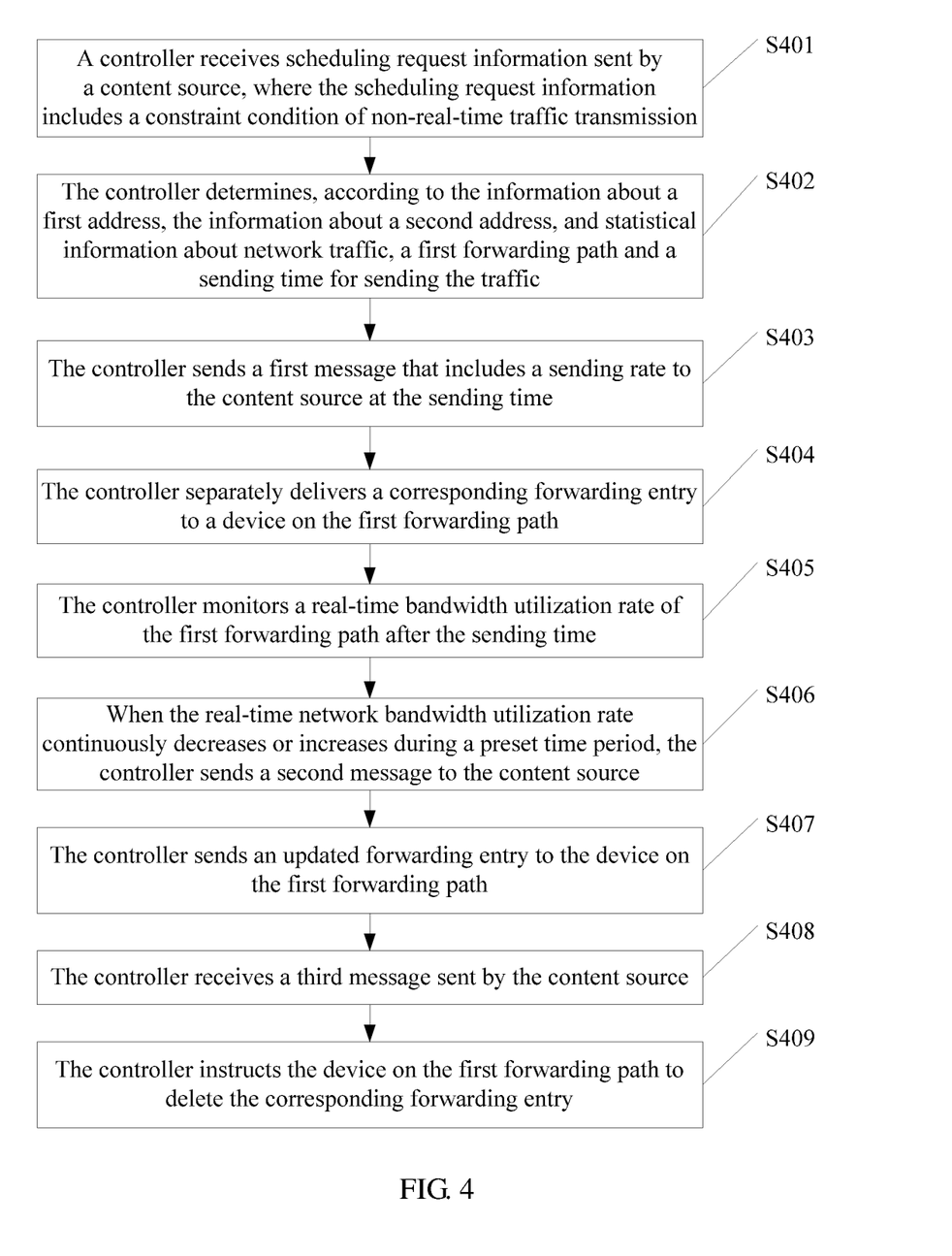
FIG. 4 is a schematic flowchart of a fourth embodiment of a scheduling method according to the application.

FIG. 4 is a schematic flowchart of a fourth embodiment of a scheduling method according to the application. In this embodiment, the method includes the following steps.

S401. A controller receives scheduling request information sent by a content source, where the scheduling request information includes a constraint condition of non-real-time traffic transmission.

The constraint condition includes: information about a first address and information about a second address, where the information about the first address is information about an address of a device that sends the traffic, and the information about the second address is information about an address of a device that receives the traffic.

S402. The controller determines, according to the information about the first address, the information about the second address, and statistical information about network traffic, a first forwarding path and a sending time for sending the traffic.

When determining the first forwarding path and the sending time for sending the traffic, the controller may first determine, according to the information about the first address and the information about the second address, forwarding paths for sending the traffic.

Specifically, there is a large number of devices in a network topology, and one link exists between every two devices. Therefore, a forwarding path from the first address to the second address may include different links. The controller may first collect statistics on forwarding paths that may be used for sending the traffic.

In these different forwarding paths, the first forwarding path and the sending time for sending the traffic are further determined from the forwarding paths according to the statistical information about network traffic. Statistics on the information about network traffic may start to be collected when a network is initialized, that is, when a network device is powered on to work, or statistics may start to be collected during a time period prior to traffic scheduling. The information about network traffic is collected and saved for network traffic analysis and prediction, which provides a good basis for subsequent traffic scheduling. For example, statistics on information about network traffic during the last three months may be collected and saved, and links and time points at which a peak and a trough of the network traffic occur, and the like are analyzed, so as to select a preferable forwarding path and sending time during subsequent traffic scheduling.

Optionally, when determining, from the forwarding paths according to the statistical information about network traffic, the first forwarding path and the sending time for sending the traffic, the controller may first select, from the forwarding paths according to the statistical information about network traffic, forwarding paths that meet a maximum link bandwidth requirement in a network, and then determine, from the forwarding paths that meet the maximum link bandwidth requirement in the network, the first forwarding path and the sending time for sending the traffic.

More optionally, when determining, from the forwarding paths that meet the maximum link bandwidth requirement in the network, the first forwarding path and the sending time for sending the traffic, the controller may determine link bandwidth utilization rates that are of the forwarding paths that meet the maximum link bandwidth requirement in the network and at a time point every other preset time period; then determine bandwidth utilization rates that are of the forwarding paths that meet the maximum link bandwidth requirement in the network and at a time point every other preset time period; and then select a forwarding path of which a bandwidth utilization rate is the lowest as the first forwarding path, and select a time at which the bandwidth utilization rate is the lowest as the sending time.

For example, information about network traffic during the last seven days may be used for analysis. It is assumed that a preset time period is 15 minutes, and statistics on link bandwidth utilization rates at all time points every 15 minutes during the last seven days may be collected, so as to obtain bandwidth utilization rates of forwarding paths. To reduce network pressure, pre-scheduling may be performed on non-real-time traffic, so as to transmit the non-real-time traffic on a first forwarding path of which a bandwidth utilization rate is the lowest and at a time at which the bandwidth utilization rate is the lowest.

For example, traffic transmitted on a forwarding path A is relatively small generally, and a network bandwidth utilization rate of the forwarding path A is relatively low during a time period from 2:00 a.m. to 5:00 a.m. Then, when non-real-time traffic transmission needs to be performed, 3:00 a.m. may be chosen to send traffic on the forwarding path A, so as to implement that in a case in which a total amount of the network traffic is not changed, utilization efficiency of the network traffic is improved, network pressure is reduced, and user experience of using a network is improved. Some useful data obtained through analysis may be saved. For example, the link bandwidth utilization rates of the forwarding paths that meet the maximum link bandwidth requirement in the network are saved. In this way, efficiency of scheduling and determining the first forwarding path and the sending time may be improved.

S403. The controller sends a first message that includes a sending rate to the content source at the sending time.

The first message is used to instruct the content source to send the traffic according to the sending rate, and the traffic is sent through the first forwarding path.

The sending rate is obtained by subtracting traffic of the first forwarding path at a preset time prior to the sending time from maximum link bandwidth of the first forwarding path.

Certainly, the first message may alternatively be sent before the sending time. However, sending the first message at the sending time helps the controller adjust scheduling according to a real-time change status of the network traffic, and real time quality is better. When the first forwarding path is selected as an optimal forwarding path, a second forwarding path may further be selected as an alternate path, so that when an emergency occurs, traffic sending can still be completed.

The constraint condition sent by the content source to the controller may further include at least one of the following: information about a time at which the traffic is transmitted, information about minimum bandwidth for transmitting the traffic, and information about a total amount of the traffic. According to the information, when selecting the first forwarding path and the sending time, the controller may select, from results obtained by the controller, a forwarding path and a sending time that meet a content source request as much as possible. For example, in the results obtained by the controller, a lowest bandwidth utilization rate of the forwarding path A is 10% at 3:00 a.m., but bandwidth of the forwarding path A is relatively low; a bandwidth utilization rate of forwarding path B is kept at 50% at 5:00 a.m., but bandwidth of a forwarding path B is relatively high; a time at which the content source requests to send the traffic is 4:30 a.m., and a total amount of the traffic is relatively large. Therefore, it is comprehensively considered that the forwarding path B may be selected as the optimal path, and 5:00 a.m. may be selected as the sending time.

S404. The controller separately delivers a corresponding forwarding entry to a device on the first forwarding path.

Specifically, after the first forwarding path is determined, by delivering the corresponding forwarding entry, the controller may notify the device on the first forwarding path of information about the scheduling, such as a total amount of traffic to be sent, a sending rate, a sending time, and a component link, which helps the related device establish a sending channel and make a preparation for sending the traffic.

S405. The controller monitors a real-time bandwidth utilization rate of the first forwarding path after the sending time.

S406. When the real-time network bandwidth utilization rate continuously decreases or increases during a preset time period, the controller sends a second message to the content source.

The second message is used to instruct the content source to adjust the sending rate for transmitting the traffic.

Specifically, when the real-time network bandwidth utilization rate continuously decreases during the preset time period, the controller instructs the content source to increase the sending rate for transmitting the traffic; or when the real-time network bandwidth utilization rate continuously increases during the preset time period, the controller instructs the content source to decrease the sending rate for transmitting the traffic.

Certainly, when the real-time network bandwidth utilization rate continuously increases during the preset time period and therefore transmission of the traffic cannot be completed, transmission of the traffic may be suspended, and transmission is not resumed until the real-time network bandwidth utilization rate decreases; or when the first forwarding path is calculated, a second forwarding path is reserved as an alternate forwarding path, so that when the first forwarding path cannot transmit the traffic, the alternative transmission path is enabled to complete transmission of the traffic.

S407. The controller sends an updated forwarding entry to the device on the first forwarding path.

If the controller instructs, according to a change of the real-time network bandwidth utilization rate, the content source to correspondingly adjust the sending rate, the controller needs to integrate adjustment information into the updated forwarding entry, and sends the updated forwarding entry to the device on the first forwarding path, so that the device performs corresponding adjustment.

S408. The controller receives a third message sent by the content source.

The third message is used to notify that transmission of the traffic is completed.

S409. The controller instructs the device on the first forwarding path to delete the corresponding forwarding entry.

After the scheduling and traffic transmission are completed, the corresponding forwarding entry is ineffective. Therefore, the controller may instruct the device on the first forwarding path to delete the corresponding forwarding entry, so as to release resources. This helps the device receive a new forwarding entry and prepare for next traffic transmission.

Figure 5:
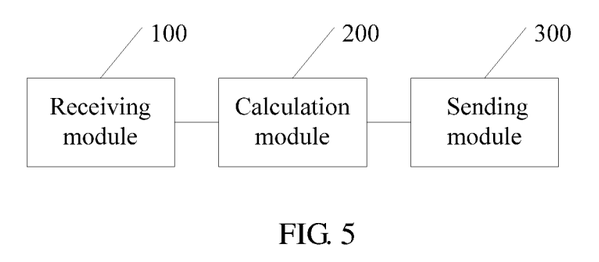
FIG. 5 is a schematic diagram of composition of a first embodiment of a scheduling apparatus according to the application.

FIG. 5 is a schematic diagram of composition of a first embodiment of a scheduling apparatus according to the application. In this embodiment, the apparatus includes: a receiving module 100, a calculation module 200, and a sending module 300.

The receiving module 100 is configured to receive scheduling request information sent by a content source, where the scheduling request information includes a constraint condition of non-real-time traffic transmission, and the constraint condition includes: information about a first address and information about a second address, where the information about the first address is information about an address of a device that sends the traffic, and the information about the second address is information about an address of a device that receives the traffic.

The calculation module 200 is configured to determine, according to the information about the first address, the information about the second address, and statistical information about network traffic, a first forwarding path and a sending time for sending the traffic.

The sending module 300 is configured to send a first message that includes a sending rate to the content source at the sending time, where the first message is used to instruct the content source to send the traffic according to the sending rate, and the traffic is sent through the first forwarding path.

The calculation module 200 is specifically configured to: determine, according to the information about the first address and the information about the second address, forwarding paths for sending the traffic; and determine, from the forwarding paths according to the statistical information about network traffic, the first forwarding path and the sending time for sending the traffic.

The calculation module 200 is further configured to: select, from the forwarding paths according to the statistical information about network traffic, forwarding paths that meet a maximum link bandwidth requirement in a network; and determine, from the forwarding paths that meet the maximum link bandwidth requirement in the network, the first forwarding path and the sending time for sending the traffic.

The calculation module 200 is still further configured to: determine link bandwidth utilization rates that are of the forwarding paths that meet the maximum link bandwidth requirement in the network and at a time point every other preset time period; determine bandwidth utilization rates that are of the forwarding paths that meet the maximum link bandwidth requirement in the network and at a time point every other preset time period; and select a forwarding path of which a bandwidth utilization rate is the lowest as the first forwarding path; and select a time at which the bandwidth utilization rate is the lowest as the sending time.

The sending rate is obtained by subtracting traffic of the first forwarding path at a preset time prior to the sending time from maximum link bandwidth of the first forwarding path.

The constraint condition further includes at least one of the following: information about a time at which the traffic is transmitted, information about minimum bandwidth for transmitting the traffic, and information about a total amount of the traffic.

The sending module 300 is further configured to: separately deliver a corresponding forwarding entry to a device on the first forwarding path.

The calculation module 200 is further configured to: save the link bandwidth utilization rates of the forwarding paths that meet the maximum link bandwidth requirement in the network.

Figure 6:
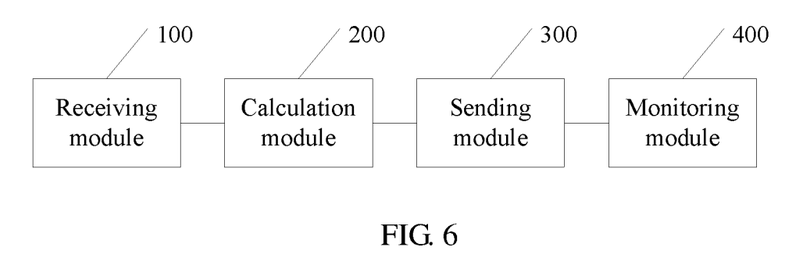
FIG. 6 is a schematic diagram of composition of a second embodiment of a scheduling apparatus according to the application.

FIG. 6 is a schematic diagram of composition of a second embodiment of a scheduling apparatus according to the application. In this embodiment, the apparatus includes: a receiving module 100, a calculation module 200, a sending module 300, and a monitoring module 400.

The receiving module 100 is configured to receive scheduling request information sent by a content source, where the scheduling request information includes a constraint condition of non-real-time traffic transmission, and the constraint condition includes: information about a first address and information about a second address, where the information about the first address is information about an address of a device that sends the traffic, and the information about the second address is information about an address of a device that receives the traffic.

The calculation module 200 is configured to determine, according to the information about the first address, the information about the second address, and statistical information about network traffic, a first forwarding path and a sending time for sending the traffic.

The sending module 300 is configured to send a first message that includes a sending rate to the content source at the sending time, where the first message is used to instruct the content source to send the traffic according to the sending rate, and the traffic is sent through the first forwarding path.

The monitoring module 400 is configured to monitor a real-time bandwidth utilization rate of the first forwarding path after the sending time.

The sending module 300 is further configured to: when the real-time network bandwidth utilization rate continuously decreases or increases during a preset time period, send a second message to the content source, where the second message is used to instruct the content source to adjust the sending rate for transmitting the traffic.

The calculation module 200 is specifically configured to: determine, according to the information about the first address and the information about the second address, forwarding paths for sending the traffic; and determine, from the forwarding paths according to the statistical information about network traffic, the first forwarding path and the sending time for sending the traffic.

The calculation module 200 is further configured to: select, from the forwarding paths according to the statistical information about network traffic, forwarding paths that meet a maximum link bandwidth requirement in a network; and determine, from the forwarding paths that meet the maximum link bandwidth requirement in the network, the first forwarding path and the sending time for sending the traffic.

The calculation module 200 is still further configured to: determine link bandwidth utilization rates that are of the forwarding paths that meet the maximum link bandwidth requirement in the network and at a time point every other preset time period; determine bandwidth utilization rates that are of the forwarding paths that meet the maximum link bandwidth requirement in the network and at a time point every other preset time period; and select a forwarding path of which a bandwidth utilization rate is the lowest as the first forwarding path; and select a time at which the bandwidth utilization rate is the lowest as the sending time.

The sending rate is obtained by subtracting traffic of the first forwarding path at a preset time prior to the sending time from maximum link bandwidth of the first forwarding path.

The constraint condition further includes at least one of the following: information about a time at which the traffic is transmitted, information about minimum bandwidth for transmitting the traffic, and information about a total amount of the traffic.

The sending module 300 is further configured to: separately deliver a corresponding forwarding entry to a device on the first forwarding path.

The calculation module 200 is further configured to: save the link bandwidth utilization rates of the forwarding paths that meet the maximum link bandwidth requirement in the network.

The sending module 300 is further configured to send an updated forwarding entry to the device on the first forwarding path.

The receiving module 100 is further configured to receive a third message sent by the content source, where the third message is used to notify that transmission of the traffic is completed.

The sending module 300 is further configured to instruct the device on the first forwarding path to delete the corresponding forwarding entry.

Figure 7:
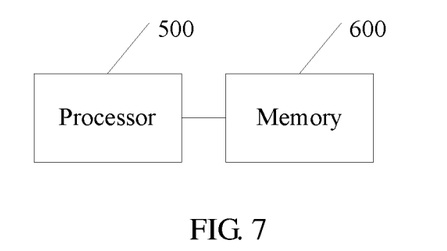
FIG. 7 is a schematic diagram of composition of a third embodiment of a scheduling apparatus according to the application.

FIG. 7 is a schematic diagram of composition of a third embodiment of a scheduling apparatus according to the application. In this embodiment, the apparatus includes a processor 500 and a memory 600 that cooperates with the processor 500.

The memory 600 is configured to store a program executed by the processor 500.

The processor 500 is configured to receive scheduling request information sent by a content source; determine, according to information about the first address, information about the second address, and statistical information about network traffic, a first forwarding path and a sending time for sending the traffic; and send a first message that includes a sending rate to the content source at the sending time, where the first message is used to instruct the content source to send the traffic according to the sending rate, and the traffic is sent through the first forwarding path.

The processor 500 is specifically configured to determine, according to the information about the first address and the information about the second address, forwarding paths for sending the traffic; select, from the forwarding paths according to the statistical information about network traffic, forwarding paths that meet a maximum link bandwidth requirement in a network; determine link bandwidth utilization rates that are of the forwarding paths that meet the maximum link bandwidth requirement in the network and at a time point every other preset time period; determine bandwidth utilization rates that are of the forwarding paths that meet the maximum link bandwidth requirement in the network and at a time point every other preset time period; and select a forwarding path of which a bandwidth utilization rate is the lowest as the first forwarding path; and select a time at which the bandwidth utilization rate is the lowest as the sending time.

The sending rate is obtained by subtracting traffic of the first forwarding path at a preset time prior to the sending time from maximum link bandwidth of the first forwarding path; the constraint condition further includes at least one of the following: information about a time at which the traffic is transmitted, information about minimum bandwidth for transmitting the traffic, and information about a total amount of the traffic.

The processor 500 is further configured to: separately deliver a corresponding forwarding entry to a device on the first forwarding path; monitor a real-time bandwidth utilization rate of the first forwarding path after the sending time; when the real-time network bandwidth utilization rate continuously decreases or increases during a preset time period, send a second message to the content source, where the second message is used to instruct the content source to adjust the sending rate for transmitting the traffic; send an updated forwarding entry to the device on the first forwarding path; receive a third message sent by the content source, where the third message is used to notify that transmission of the traffic is completed; instruct the device on the first forwarding path to delete the corresponding forwarding entry; and save the link bandwidth utilization rates of the forwarding paths that meet the maximum link bandwidth requirement in the network.

Figure 8:
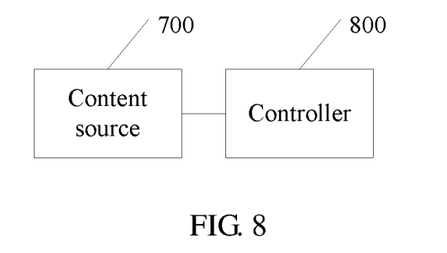
FIG. 8 is a schematic diagram of composition of a scheduling system according to an embodiment of the application.

FIG. 8 is a schematic diagram of composition of a scheduling system according to an embodiment of the application. In this embodiment, the system includes a content source 700 and a controller 800.

The content source 700 is configured to send scheduling request information, where the scheduling request information includes a constraint condition of non-real-time traffic transmission, and the constraint condition includes: information about a first address and information about a second address, where the information about the first address is information about an address of a device that sends the traffic, and the information about the second address is information about an address of a device that receives the traffic.

The controller 800 is configured to receive the scheduling request information; determine, according to the information about the first address, the information about the second address, and statistical information about network traffic, a first forwarding path and a sending time for sending the traffic; and send a first message that includes a sending rate to the content source at the sending time, where the first message is used to instruct the content source to send the traffic according to the sending rate, and the traffic is sent through the first forwarding path.

The controller 700 is specifically configured to: determine, according to the information about the first address and the information about the second address, forwarding paths for sending the traffic; select, from the forwarding paths according to the statistical information about network traffic, forwarding paths that meet a maximum link bandwidth requirement in a network; determine link bandwidth utilization rates that are of the forwarding paths that meet the maximum link bandwidth requirement in the network and at a time point every other preset time period; determine bandwidth utilization rates that are of the forwarding paths that meet the maximum link bandwidth requirement in the network and at a time point every other preset time period; and select a forwarding path of which a bandwidth utilization rate is the lowest as the first forwarding path; and select a time at which the bandwidth utilization rate is the lowest as the sending time.

The sending rate is obtained by subtracting traffic of the first forwarding path at a preset time prior to the sending time from maximum link bandwidth of the first forwarding path; the constraint condition further includes at least one of the following: information about a time at which the traffic is transmitted, information about minimum bandwidth for transmitting the traffic, and information about a total amount of the traffic.

Optionally, the controller is further configured to: separately deliver a corresponding forwarding entry to a device on the first forwarding path; monitor a real-time bandwidth utilization rate of the first forwarding path after the sending time; when the real-time network bandwidth utilization rate continuously decreases or increases during a preset time period, send a second message to the content source, where the second message is used to instruct the content source to adjust the sending rate for transmitting the traffic; send an updated forwarding entry to the device on the first forwarding path; receive a third message sent by the content source, where the third message is used to notify that transmission of the traffic is completed; instruct the device on the first forwarding path to delete the corresponding forwarding entry; and save the link bandwidth utilization rates of the forwarding paths that meet the maximum link bandwidth requirement in the network.

Figure 9:
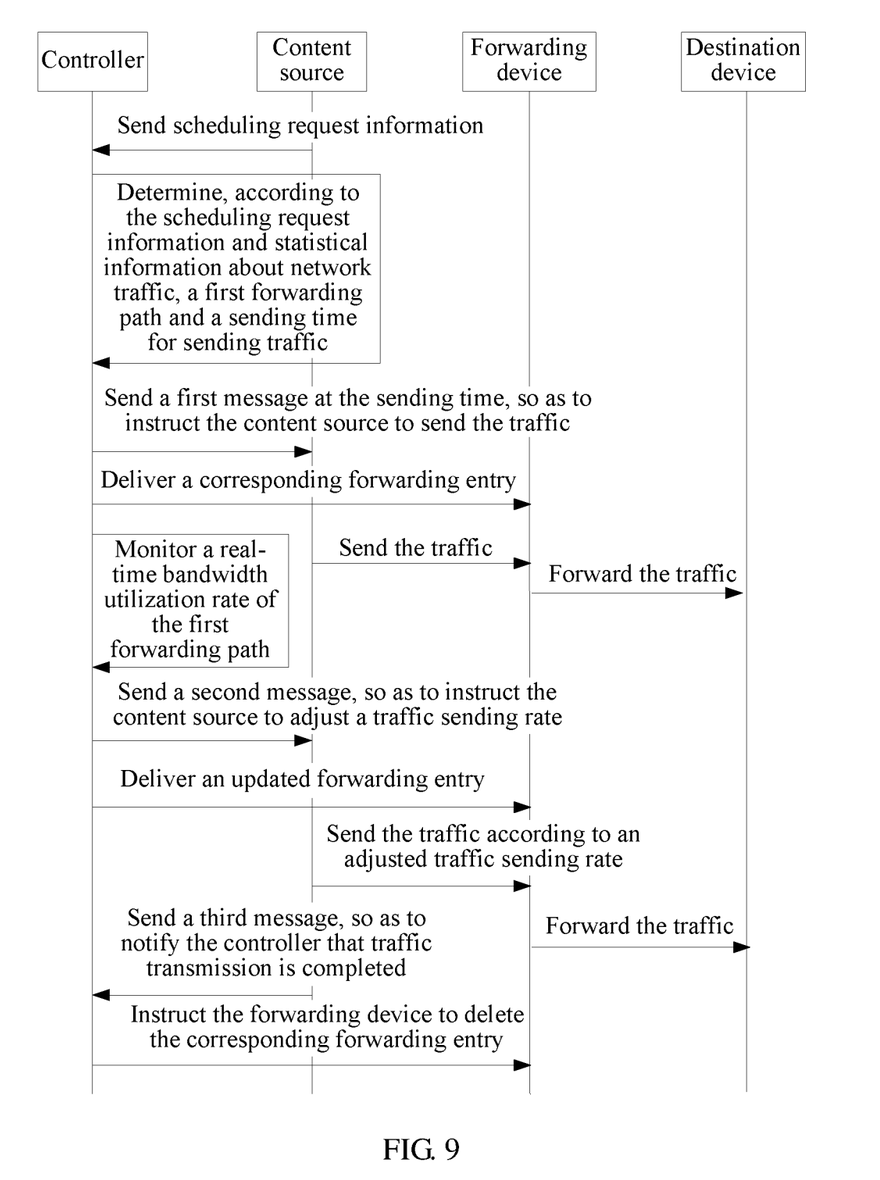
FIG. 9 is a schematic diagram of information interaction during which the scheduling system in FIG. 8 is used.

FIG. 9 is a schematic diagram of information interaction during which the scheduling system in FIG. 8 is used.

A content source first sends scheduling request information to a controller, where the scheduling request information includes a constraint condition of non-real-time traffic transmission, and the constraint condition includes: information about a first address and information about a second address, where the information about the first address is information about an address of a device that sends the traffic, and the information about the second address is information about an address of a device that receives the traffic.

The controller determines, according to the scheduling request information and statistical information about network traffic, a first forwarding path and a sending time for sending the traffic.

The controller sends a first message to the content source at the sending time, so as to instruct the content source to send the traffic according to the determined first forwarding path and sending time.

The controller delivers a corresponding forwarding entry to a forwarding device on the first forwarding path.

The content source sends the traffic to the forwarding device, and then the forwarding device forwards the traffic to a destination device.

The controller monitors a real-time bandwidth utilization rate of the first forwarding path, and generate, according to an increase or a decrease of the real-time bandwidth utilization rate, a second message used for adjusting a traffic sending rate.

The controller sends the second message to the content source, so as to instruct the content source to adjust the traffic sending rate.

The controller delivers an updated forwarding entry to a related forwarding device.

After adjusting the traffic sending rate, the content source sends the traffic to the forwarding device according to an adjusted traffic sending rate.

The forwarding device forwards the traffic to the destination device.

After traffic transmission is completed, the content source sends a third message, so as to notify the controller that traffic transmission is completed.

The controller instructs the related forwarding device to delete the corresponding forwarding entry.

At this point, the scheduling and traffic transmission are completed.

It should be noted that the embodiments of the present specification are described in a progressive manner. Description of each embodiment focuses on its difference from other embodiments. For same or similar parts of the embodiments, mutual reference to each other may be made. For an apparatus embodiment, the apparatus embodiment is described briefly because it is basically similar to the method embodiment, and, for relevant parts, refer to a part of description of the method embodiment.

According to description of the foregoing embodiments, the application has the following advantages.

Pre-scheduling is performed on non-real-time traffic, and a first forwarding path and a sending time for sending the traffic are determined according to scheduling request information of a content source and statistical information about network traffic. In this way, occurrence of a traffic peak can be reduced, network pressure can be relieved, and in a case in which a total amount of the network traffic is not changed, a utilization rate of the network traffic can be improved and cases in which a network is congested can be reduced. This helps improve user experience of using the network.

A person of ordinary skill in the art may understand that all or some of the method embodiments may be implemented by a program instructing relevant hardware. The program may be stored in a computer readable storage medium. When the program runs, the method embodiments are performed. The foregoing storage medium includes: any medium that can store program code, such as a ROM, a RAM, a magnetic disk, or an optical disc.

The above provides detailed description of a scheduling method, apparatus, and system provided in the embodiments of the application. In this specification, specific examples are used to illustrate the principle and implementation manners of the application, and the foregoing description of the embodiments is only intended to help understand the method and core idea of the application. Meanwhile, a person of ordinary skill in the art may, based on the idea of the application, make modifications with respect to the specific implementation manners and the application range. In conclusion, the content of this specification shall not be construed as a limitation to the application.

What is claimed is:

1. A scheduling method, comprising:
receiving, by a controller from a content source, a scheduling request requesting pre-scheduling of a traffic transmission between a first device and a second device in a network, wherein the scheduling request comprises a constraint condition of non-real-time traffic transmission, and wherein the constraint condition comprises information about a first address and information about a second address, wherein the information about the first address includes information about an address of the first device that sends traffic, and the information about the second address includes information about an address of the second device that receives the traffic;
determining, by the controller, a first forwarding path, a sending rate and a sending time for sending the traffic according to the information about the first address, the information about the second address, and statistical information about network traffic, wherein determining the first forwarding path, the sending rate and the sending time for sending the traffic comprises:
determining, by the controller, a plurality of forwarding paths for sending the traffic according to the information about the first address and the information about the second address; and determining, by the controller, a first forwarding path from the plurality of forwarding paths, the sending rate and the sending time for sending the traffic, the first forwarding path, the sending rate, and the sending time being determined according to the statistical information; and sending, by the controller, a first message to the content source at the sending time, wherein the first message comprises the sending rate and is used to instruct the content source to send the traffic according to the sending rate, so that the traffic is sent through the first forwarding path; and wherein the method further comprises:

monitoring, by the controller, a real-time bandwidth utilization rate of the first forwarding path after the sending time; and when the real-time bandwidth utilization rate continuously decreases or increases during a preset time period, sending, by the controller, a second message to the content source, wherein the second message is used to instruct the content source to adjust the sending rate for transmitting the traffic.

2. The method according to claim 1, wherein determining the first forwarding path and the sending time for sending the traffic comprises:

selecting, by the controller, forwarding paths that meet a maximum link bandwidth requirement in a network from the plurality of forwarding paths according to the statistical information; and determining, by the controller, the first forwarding path and the sending time for sending the traffic from the forwarding paths that meet the maximum link bandwidth requirement in the network.

3. The method according to claim 2, wherein determining the first forwarding path and the sending time for sending the traffic comprises:

determining, by the controller, link bandwidth utilization rates that are of the forwarding paths that meet the maximum link bandwidth requirement in the network and at a time point every other preset time period;

determining, by the controller, bandwidth utilization rates that are of the forwarding paths that meet the maximum link bandwidth requirement in the network and at a time point every other preset time period;

selecting, by the controller, a forwarding path of which a bandwidth utilization rate is the lowest as the first forwarding path; and selecting, by the controller, a time at which the bandwidth utilization rate is the lowest as the sending time.

4. The method according to claim 1, wherein the sending rate is obtained by subtracting traffic of the first forwarding path at a preset time prior to the sending time from maximum link bandwidth of the first forwarding path.

5. The method according to claim 1, wherein the constraint condition further comprises at least one of the following: information about a time at which the traffic is transmitted, information about minimum bandwidth for transmitting the traffic, and information about a total amount of the traffic.

6. The method according to claim 1, wherein the method further comprises separately delivering, by the controller, a corresponding forwarding entry to a device on the first forwarding path.

7. An apparatus comprising:
a processor; and
a non-transitory computer-readable storage medium storing a program to be executed by the processor, the program including instructions for:

receiving, from a content source, a scheduling request requesting pre-scheduling of a traffic transmission between a first device and a second device in a network, wherein the scheduling request comprises a constraint condition of non-real-time traffic transmission, the constraint condition comprising information about a first address and information about a second address, wherein the information about the first address includes information about an address of the first device that sends traffic, and the information about the second address includes information about an address of the second device that receives the traffic;

determining a first forwarding path, a sending rate and a sending time for sending the traffic according to the information about the first address, the information about the second address, and statistical information of network traffic, wherein determining the first forwarding path, the sending rate and the sending time for sending the traffic comprises:

determining a plurality of forwarding paths for sending the traffic according to the information about the first address and the information about the second address; and determining a first forwarding path from the plurality of forwarding paths, the sending rate and the sending time for sending the traffic according to the statistical information of network traffic; and sending a first message that comprises the sending rate to the content source at the sending time, wherein the first message is used to instruct the content source to send the traffic according to the sending rate; and wherein the program includes further instructions for:

monitoring a real-time bandwidth utilization rate of the first forwarding path after the sending time; and when the real-time bandwidth utilization rate continuously decreases or increases during a preset time period, sending a second message to the content source, wherein the second message is used to instruct the content source to adjust the sending rate for transmitting the traffic.

8. The apparatus according to claim 7, wherein the program includes further instructions for sending an updated forwarding entry to a device on the first forwarding path.

9. The apparatus according to claim 7, wherein the program includes further instructions for:

selecting forwarding paths that meet a maximum link bandwidth requirement in a network from the plurality of forwarding paths according to the statistical information of network traffic; and determining the first forwarding path and the sending time for sending the traffic from the forwarding paths that meet the maximum link bandwidth requirement in the network.

10. The apparatus according to claim 9, wherein the program includes further instructions for:

determining link bandwidth utilization rates that are of the forwarding paths that meet the maximum link bandwidth requirement in the network and at a time point every other preset time period;

determining bandwidth utilization rates that are of the forwarding paths that meet the maximum link bandwidth requirement in the network and at a time point every other preset time period;

selecting a forwarding path of which a bandwidth utilization rate is the lowest as the first forwarding path; and selecting a time at which the bandwidth utilization rate is the lowest as the sending time.

11. The apparatus according to claim 10, wherein the program includes further instructions for saving the link bandwidth utilization rates of the forwarding paths that meet the maximum link bandwidth requirement in the network.

12. The apparatus according to claim 7, wherein the sending rate is obtained by subtracting traffic of the first forwarding path at a preset time prior to the sending time from maximum link bandwidth of the first forwarding path.

13. The apparatus according to claim 7, wherein the constraint condition further comprises at least one of the following: information about a time at which the traffic is transmitted, information about minimum bandwidth for transmitting the traffic, and information about a total amount of the traffic.

14. The apparatus according to claim 7, wherein the program includes further instructions for separately delivering a corresponding forwarding entry to a device on the first forwarding path.

15. The apparatus according to claim 14, wherein the program includes further instructions for:
receiving a third message sent by the content source, wherein the third message is used to notify that transmission of the traffic is completed; and
instructing a device on the first forwarding path to delete the corresponding forwarding entry.

16. A scheduling system, comprising:
a content source, configured to send a scheduling request requesting pre-scheduling of a traffic transmission between a first device and a second device in a network, wherein the scheduling request comprises a constraint condition of non-real-time traffic transmission, the constraint condition comprising information about a first address and information about a second address, wherein the information about the first address includes information about an address of the first device that sends the traffic, and the information about the second address includes information about an address of the second device that receives the traffic; and a controller, configured to receive the scheduling request, to determine a first forwarding path, a sending rate and a sending time for sending the traffic according to the information about the first address, the information about the second address, and statistical information of network traffic by determining a plurality of forwarding paths for sending the traffic according to the information about the first address and the information about the second address, and determining a first forwarding path from the plurality of forwarding paths, the sending rate and the sending time for sending the traffic according to the statistical information of network traffic, and to send a first message that comprises the sending rate to the content source at the sending time, wherein the first message is used to instruct the content source to send the traffic according to the sending rate, so that the traffic is sent through the first forwarding path, wherein the controller is further configured to monitor a real-time bandwidth utilization rate of the first forwarding path after the sending time, and when the real-time bandwidth utilization rate continuously decreases or increases during a preset time period, to send a second message to the content source, the second message instructing the content source to adjust the sending rate for transmitting the traffic.

17. The scheduling system according to claim 16, wherein the first forwarding path and the sending time for sending the traffic are determined by:
selecting, by the controller, forwarding paths that meet a maximum link bandwidth requirement in a network from the plurality of forwarding paths according to the statistical information of network traffic; and
determining, by the controller, the first forwarding path and the sending time for sending the traffic from the forwarding paths that meet the maximum link bandwidth requirement in the network.

18. The scheduling system according to claim 17, wherein the sending rate is obtained by subtracting traffic of the first forwarding path at a preset time prior to the sending time from maximum link bandwidth of the first forwarding path.

* * * * *